United States Patent

Heiskanen et al.

[11] Patent Number: 5,601,148
[45] Date of Patent: Feb. 11, 1997

[54] ARRANGEMENT FOR MEASURING THE POSITION OF A FEED BEAM IN A ROCK DRILLING APPARATUS AND/OR MEASURING THE POSITION OF A ROCK DRILL

[75] Inventors: Pekka Heiskanen, Nokia; Pauli Lemmetty; Matti Rissanen, both of Tampere, all of Finland

[73] Assignee: Tamrock Oy, Finland

[21] Appl. No.: 387,868

[22] PCT Filed: Aug. 25, 1993

[86] PCT No.: PCT/FI93/00335

§ 371 Date: Feb. 24, 1995

§ 102(e) Date: Feb. 24, 1995

[87] PCT Pub. No.: WO94/06999

PCT Pub. Date: Mar. 31, 1994

[30] Foreign Application Priority Data

Sep. 11, 1992 [FI] Finland .................................. 924085

[51] Int. Cl.[6] ............................................. E21C 11/00
[52] U.S. Cl. ............................................. 173/21; 173/147
[58] Field of Search .................................... 173/2, 3, 6, 11, 173/20, 21, 147

[56] References Cited

U.S. PATENT DOCUMENTS 2,623,387  12/1952  Pitcher et al. ................ 173/21
2,891,424   6/1959  Carlstedt ...................... 173/21
4,113,033   9/1978  Lindblad ....................... 173/21
4,461,015   7/1984  Kulhavy ........................ 173/21
4,537,263   8/1985  Bjor .
4,830,119   5/1989  Haney et al. .................. 173/21

FOREIGN PATENT DOCUMENTS 453111     4/1982  Sweden .
WO92/21853 12/1992  WIPO .

*Primary Examiner*—Scott A. Smith
*Attorney, Agent, or Firm*—Nixon & Vanderhye, P.C.

[57] ABSTRACT

An arrangement for measuring the position of a feed beam (1) in a rock drilling apparatus relative to a cradle (4) therein, or measuring the position of a rock drill (3) relative to the feed beam (1). In the arrangement an inelastic, flexible cogged belt (6; 13) is fixed to the feed beam (1) to the surface thereof, the cogged belt (6; 13) being installed to turn about the gear (9; 15) of a resolver mounted in a cradle (4) or movably with the rock drill (3), so that when the feed beam (1) moves relative to the cradle or when the rock drill (3) moves relative to the feed beam (1), the cogged belt (6; 13) rotates the gear (9; 15) of the resolver, and the resolver measures the position of the feed beam (1) or the rock drill (3) respectively.

9 Claims, 2 Drawing Sheets

ARRANGEMENT FOR MEASURING THE POSITION OF A FEED BEAM IN A ROCK DRILLING APPARATUS AND/OR MEASURING THE POSITION OF A ROCK DRILL

TECHNICAL FIELD

BACKGROUND

The present invention relates to an arrangement for measuring the position of a feed beam relative to a cradle and/or measuring the position of a rock drill relative to the feed beam in a drill unit in a rock drilling apparatus, comprising a cradle attachable to a boom, a feed beam installed in the cradle movably relative to the cradle in the longitudinal direction of the feed beam, and a rock drill connected to the feed beam movably in the longitudinal direction of the feed beam, the arrangement comprising an elongated toothed indicator member fixed to the feed beam in its longitudinal direction and a gear connected to the indicator member and contacting the toothing of the indicator member, wherein with the movement of the feed beam relative to the cradle or respectively the movement of the rock drill relative to the feed beam the indicator member rotates the gear and the indicator measuring the rotation of the gear emits signals proportional to the movement.

When a hole is being drilled with a rock drilling apparatus, it is important to know how deep a hole has been drilled. To determine the accurate depth of the hole, the position of the feed beam relative to the cradle of the rock drill must also be known. In known equipment, a rack secured to the feed beam in the longitudinal direction thereof is employed to indicate the position, said rack rotating a pinion contacting it and thereby a resolver connected to the pinion. The resolver in turn transforms the direction and length of the movement to an electrical signal that can be employed for example for controlling automatic control devices.

The problem with the known solution is that the pinion and rack are subject to wear on the action of their relative movement, particularly when dirt and rock dust enter between them. Likewise, the teeth of the rack are easily damaged when they hit rocks, and consequently can also damage the pinion. On account of shocks and vibration, the pinion can jump over a tooth in the rack, which causes a measuring error and thereby also errors in drilling. Further, vibration and shocks can result in tearing of the fastening sleeves of the pinion, and thus the pinion can move so far from the rack that it no longer properly contacts it, with the result that measuring is practically impossible. The fixing of the rack to the feed beam also involves extra manufacturing steps and a considerable amount of work in installation and replacement, since the rack must be fixed to the feed beam with screws or similar at suitable intervals.

On account of the above factors, for example the zero point of the sensor may shift, and thus for example in automatic drilling the sensor will give incorrect values. As a result, the moving of the feed beam to the vicinity of the rock surface to be drilled, i.e. driving into rock, is hindered and the feed beam can hit the rock surface at too high a speed or with too high a force and consequently be damaged. Similarly, with automatic control the drill boom can behave differently than expected on account of incorrect values. Therefore, it is necessary in all rock drilling machines to calibrate the sensor measuring the position of the feed beam often, which causes extra service and repair work.

Furthermore, Swedish Published Specification No. 453 111 discloses a solution in which the longitudinal movement of the feed beam is measured by employing the quantity of the hydraulic flow of the feed motor of the rock drill. The drawback of this solution is that The clearance and wear of the motor cause a measuring error, and furthermore said error varies with the variation of the transfer resistance. The measuring value thus obtained is not sufficiently reliable in the long run, and also requires frequent calibration.

SUMMARY OF THE INVENTION

It is an object of the present invention to provide an arrangement for measuring the movement and position of the feed beam, wherewith the above-stated difficulties are avoided and wherewith the operation of the drilling apparatus is secure and reliable even for long periods of time. A further object of the invention is to provide an arrangement for measuring the movement and position of the feed beam, being simple and quick to maintain, repair and install. The arrangement of the invention is characterized in that the indicator member is an essentially inelastic but flexible cogged belt fixed at both ends to the feed beam, and that the gear is connected to the cradle and/or the drill for contact with the cogged belt so that the cogged belt turns about the gear for a part of the periphery of the gear.

It is an essential idea of the invention that an essentially inelastic but flexible cogged belt is employed as the indicator member. This cogged belt transmits the movement of the feed beam to a resolver provided in the cradle, or respectively the movement of the rock drill relative to the feed beam to the resolver moving together with the rock drill via the gear contacting the resolver. Further, it is an essential idea of the invention that the cogged belt is turned about the gear of the resolver so as to contact a part of the periphery of the gear, preferably about half of the diameter of the gear, and thus the teeth of the cogged belt and gear cannot jump over each other, thus maintaining contact between them and providing for reliable and secure expression of the movement of the feed beam or the rock drill respectively.

The advantage of the arrangement of the invention is that the flexible and inelastic cogged belt is simple to install and fix at both ends to the feed beam to be suitably tensioned. Further, when the cogged belt becomes damaged it is easy to replace, as it only needs to be fixed with its ends to the feed beam. A further advantage of the arrangement of the invention is that position errors between the feed beam and cradle or the rock drill and feed beam are avoided, thus enabling permanently reliable operation of the arrangement.

The invention will be more closely explained in the accompanying drawings.

DETAILED DESCRIPTION OF THE DRAWINGS

Figure 1:
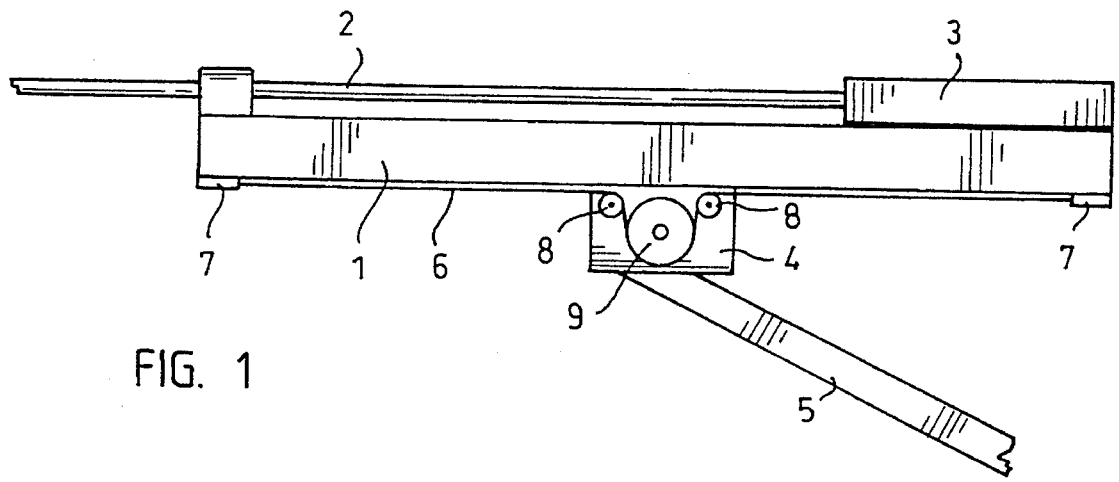
FIG. 1 is a schematic representation of a preferred embodiment of an arrangement of the invention.

FIG. 1 is a schematic representation of a rock drilling apparatus, having a feed beam 1 above which a rock drill 3 rotating a drill rod 2 moves. The feed beam 1 is connected movably relative to a cradle 4 in its longitudinal direction in a manner known per se, and the feed beam is moved by a power unit operating between the feed beam and the cradle also in a manner known per se. The cradle 4 in turn is fixed to the end of a conventional drill boom 5. Since the above movements between the feed beam and cradle and also the parts, devices and power units needed to produce said movements and the movement between the rock drill and feed beam are commonly known and self-evident to those skilled in the art and inessential to the invention, it is not considered necessary to explain them more closely in this connection.

As an indicator member, a cogged belt 6 is fixed at both ends with fixing means 7 to the feed beam 1 in the longitudinal direction thereof, to the side facing the cradle 4 and preferably to the surface facing the cradle 4. The cogged belt 6 is preferably a cogging installed towards the surface of the feed beam 1, so that it is protected from dust and dirt as far as possible. The cogged belt 4 turns relative to the cradle 4 about diverter pulleys 8a and 8b fixed to the cradle 4 away from the feed beam and further about the gear 9 of the resolver (not shown), provided within the cradle 4 and serving as an indicator, approximately half a turn, so that the gear 9 remains between the cogged belt 6 and the feed beam 1.

Figure 2:
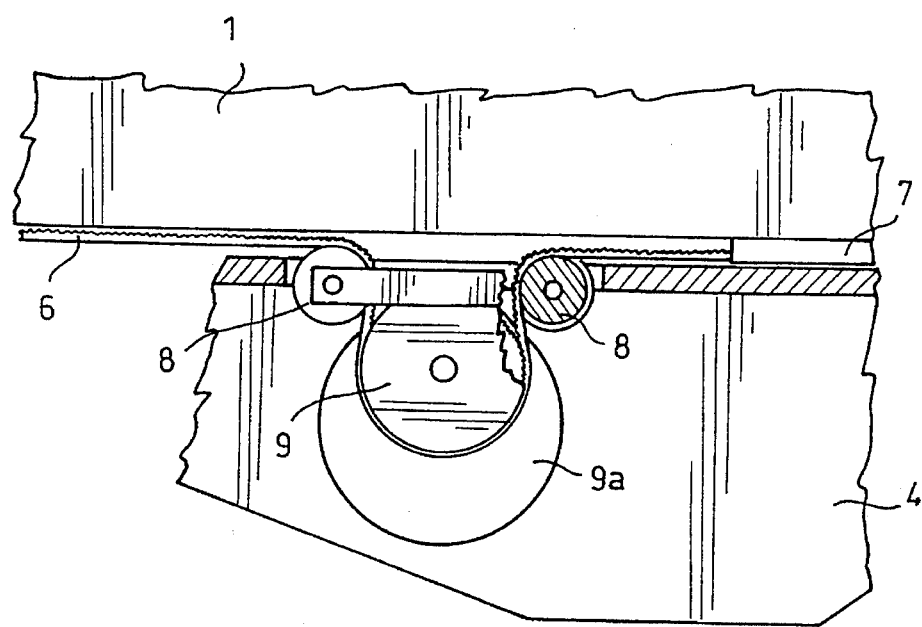
FIG. 2 is a schematic representation of a detail of the arrangement of the invention, of the passage of a cogged belt about the gear of a resolver mounted in a cradle.

FIG. 2 shows in closer detail how the cogged belt 6 passes about the gear 9 of the resolver 9a. The cogged belt 6 which enters in the direction of the feed beam 1 turns about the diverter pulley 8a at the first end of the feed beam away from the feed beam and subsequently turns about the gear 9, returns towards the feed beam 1 and turns about the second diverter pulley 8b to have substantially the direction of the feed beam 1 towards its other end. With this solution, an extended contact surface is achieved between the cogged belt 6 and gear 9, and thus the jumping of the teeth relative to each other is impossible, and furthermore, the contact surface can be extended from that shown in the Figure—from a contact length of about half the periphery of the gear—to be substantially greater, i.e. in excess of 270° of the periphery of the gear, if it is desired to avoid jumping as far as possible.

Figure 3B:
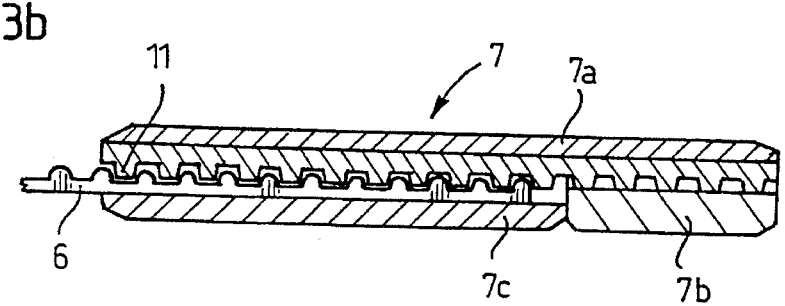
FIGS. 3a and 3b are schematic top and side views, partly in section, of a cogged-belt fixing means advantageously suitable for the arrangement of the invention.
Figure 3A:
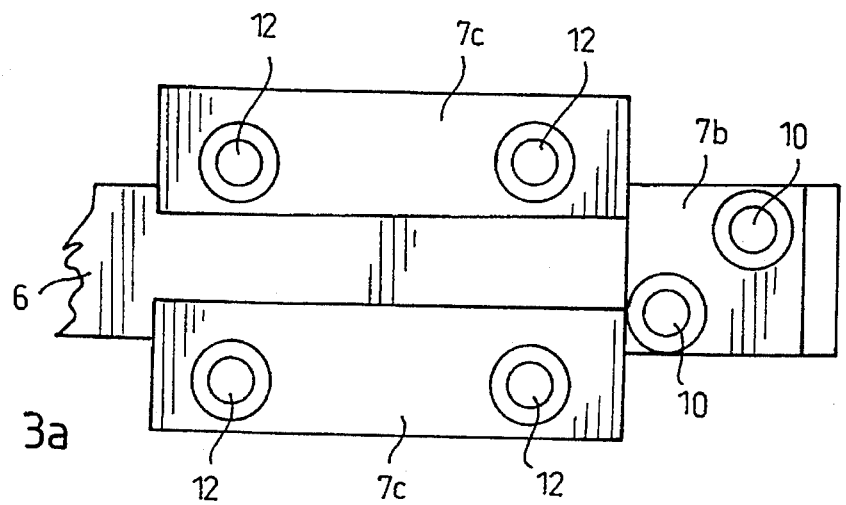

FIGS. 3a and 3b are schematic views of a cogged-belt fixing means 7 advantageously suitable for the arrangement of the invention, wherewith the cogged belt 6 can easily be fixed to each end of the feed beam 1 and by means of which the cogged belt can easily be replaced. The fixing means 7 has a body 7a to be installed against that surface of the feed beam 1 which faces the cradle 4. The fixing means further comprises a fixing member 7b that can be clamped against the body 7a with screws 10. The fixing member 7b and the body 7a form between them an elongated groove having substantially the direction of the feed beam 1. The groove is so dimensioned that the cogged belt will fit into it. Further, the fixing means 7 includes clamping means 7c with which the end of the cogged belt is actually fixed and which are to be placed on both sides of the cogged belt 6 and press the cogged belt 6 towards the body 7a. An essential part of the fixing means 7 is a piece 11 of belt to be cut from the cogged belt employed, which is laid in the fixing means 7 in the groove of the body and fixing member, the flat back portion towards the feed beam 1, i.e. the toothing against the toothing of the cogged belt 6, and secured with screws 10 and a fixing member 7b immovably relative to the body 7a. The actual fixing of the cogged belt 1 is performed by laying its end into the fixing means 7, the toothing facing the feed beam 1, against the piece 11 of belt in such a way that the teeth of each engage the tooth gaps of the other and thereby prevent the teeth from relative sliding. The clamping means 7c and their fixing screws 12 press the end of the cogged belt against the piece 11 of belt with an appropriate force.

The fixing means 7 are disposed at each end of the feed beam 1, the cogged belt thus being easy to install by laying one end of the cogged belt into the fixing means 7 at one end of the feed beam and by clamping it with clamping means 7c. Thereafter the cogged belt 6 is passed via diverter pulleys 8a and 8b about the gear 9 of the resolver in the cradle, and the other end of the cogged belt is fixed to the fixing means 7 at the opposite end of the feed beam as set forth previously. This fixing solution has the advantage that the installation and replacement of the cogged belt 6 is simple and easy, and the cogged belt remains securely fixed with adequate load with no further measures. A further advantage of this solution is that if the clamping force of the clamping means 7c is sufficient, the cogged belt 6 can yield to an excessive force, and, likewise, in that event the piece 11 of belt in the fixing means 7 and the toothing of the cogged belt and the piece of belt can move from one tooth gap to another. Thus the cogged belt 6 will not break unnecessarily.

In the arrangement of the invention, upon movement of the feed beam 1 relative to the cradle 4 the cogged belt 6 moves along with the feed beam 1 at the same speed, and simultaneously passes about the gear 9 of the resolver 9a. This generates in the resolver a signal proportional to the movement, allowing the position of the feed beam 1 relative to the cradle 4 to be accurately measured. When the cogged belt 6 is suitably tensioned in the longitudinal direction of the feed beam 1, the rotating movement of the gear 9 of the resolver and the longitudinal movement of the feed beam 1 are precisely proportional, and thus the signal emitted by the resolver for distance and position is also accurate. If the cogged belt 6 is damaged so as to render the measuring inoperative, the belt can be replaced relatively rapidly and easily, since it only requires passing of a new cogged belt about the gear of the resolver and fixing its ends to the fixing means 7 at the ends of the feed beam. The operation of the resolver and generation of a signal by means of it are commonly known as such, and therefore it is not considered necessary to explain them more closely herein.

Figure 4:
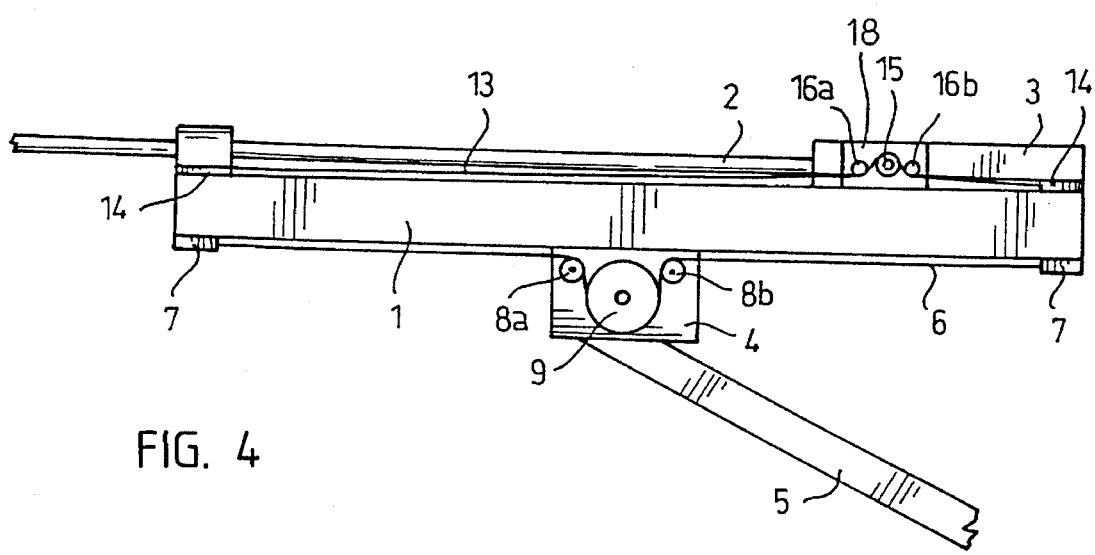
FIG. 4 is a schematic representation of another preferred embodiment of the arrangement of the invention.

FIG. 4 shows another preferred embodiment of the invention wherein, in addition to the measuring of the relative movement of the feed beam 1 and the cradle 4, the arrangement further includes means for measuring the relative movement of the rock drill 3 and the feed beam 1. In FIG. 4, reference numerals as used in FIG. 1 are utilized for component parts which correspond to those of FIG. 1. In FIG. 4, a second cogged belt 13 is fixed on the rock drill 3 side of the feed beam 1 similarly as cogged belt 6, the ends of the second cogged belt being fixed to feed beam 1 with fixing means 14 corresponding to the fixing means 7. The second carriage, or cradle, shown generally at 18 moves simultaneously with the rock drill has contact with a second gear 15 that is connected—similarly as gear 9—to an indicator indicating the rotation of the gear 15. The cogged belt 13 in turn is passed, as shown in FIG. 1, via a first diverter pulley 16a to turn away from the feed beam 1 and to pass about the gear 15 in such a way that the toothings in the cogged belt 13 and gear 15 contact one another, and subsequently to return from under a second diverter pulley 16b, to further turn in the direction of the feed beam 1. In this case, as the rock drill 3 moves along the feed beam the belt 13 will remain stationary and the gear 15 will rotate, the indicator connected to the axle of the gear emitting a signal proportional to the distance travelled. Thus the indicator will indicate the position of the rock drill 3, relative to the longitudinal direction of the feed beam 1, from its normal zero position which is typically the rearmost position of the rock drill on the feed beam 1. In principle, both the position of the rock drill 3 relative to the feed beam 1 and the position of the feed beam 1 relative to the cradle 4 are measured similarly and with a similar arrangement, thus making the apparatus easy to manufacture and allowing for a construction in which the same components can be employed for both types of measuring.

In the foregoing description and drawings, the invention has been explained by way of example only, and the invention is in no way to be so restricted. The cogged belt can have different shapes and toothings and its passage along the surface of the gear of the resolver or other indicator can be realized in different ways. By means of suitable diverter pulley arrangements, the cogged belt can be made for example to pass between the gear of the resolver and the feed beam, the toothing facing away from the feed beam, as long as the contact of the cogged belt along the periphery of the gear of the resolver is sufficient to allow no jumping of the Teeth, in contrast to the prior art. The grooves in The fixing means required for the cogged belt can also be realized in some other way, and the grooves can also be provided in the clamping means if it is desirable that the toothing faces away from the feed beam. The resolver with gear and the diverter pulleys can be mounted directly in the cradle, rock drill or drill carriage, or secured to a separate frame that in turn is fixed to the cradle and correspondingly to the rock drill or drill carriage. Instead of a resolver, some other indicator can be employed for calculating the rotation of the gear, as long as an indicator signal having the form required for automatic control is obtained.

We claim:

1. An arrangement for measuring the position of a feed beam relative to a cradle in a drill unit in a rock drilling apparatus, comprising a cradle attachable to a boom, a feed beam installed in the cradle for movement relative to the cradle in a longitudinal direction of the feed beam, and a rock drill connected to the feed beam movably in said longitudinal direction of the feed beam, the arrangement further comprising an elongated substantially inelastic, flexible cogged belt fixed at opposite ends thereof to the feed beam for movement with the feed beam in said longitudinal direction, and a gear mounted in said cradle and engaged by teeth of said cogged belt, wherein with the movement of the feed beam relative to the cradle, said cogged belt turns about said gear for a part of the periphery of said gear and rotates said gear, and an indicator measures rotation of the gear and emits signals proportional to the movement of the feed beam, such that the position of the feed beam relative to the cradle is measured.

2. An arrangement as claimed in claim 1, further comprising first and second diverter pulleys installed forwardly and rearwardly of said gear, respectively, in said longitudinal direction of the feed beam and wherein said teeth face said feed beam to turn about said first diverter pulley away from said feed beam, to turn about said gear back towards said feed beam and further to turn about said second diverter pulley.

3. An arrangement as claimed in claim 1, wherein fixing means are installed in said feed beam for fixing the ends of the cogged belt, the fixing means having grooves which match with said teeth of the cogged belt and in which said teeth of the cogged belt can be received, and at least one clamping means for clamping the cogged belt against the grooves, thereby fixing said cogged belt immovably relative to the feed beam.

4. An arrangement as claimed in claim 3, wherein the grooves in the fixing means are provided by a piece of cogged belt secured to the fixing means, installed with teeth of the piece meshing with the teeth of the cogged belt.

5. An arrangement as claimed in claim 1 including a second cradle attachable to the rock drill for movement with the rock drill relative to the feed beam in a longitudinal direction of the feed beam, the arrangement further comprising a second elongated substantially inelastic, flexible second cogged belt fixed at opposite ends thereof to the feed beam, and a second gear mounted in said second cradle and engaged by teeth of said second cogged belt, wherein with the movement of the rock drill and second cradle relative to the feed beam, said second cogged belt turns about said second gear for a part of the periphery of said second gear and rotates said second gear, and a second indicator measures rotation of said second gear and emits signals proportional to the movement of the rock drill, such that the position of the rock drill relative to the feed beam is measured.

6. An arrangement for measuring the position of a rock drill relative to a feed beam in a drill unit in a rock drilling apparatus, comprising a cradle attachable to the rock drill for movement with the rock drill relative to the feed beam in a longitudinal direction of the feed beam, the arrangement further comprising an elongated substantially inelastic, flexible cogged belt fixed at opposite ends thereof to the feed beam, and a gear mounted in said cradle and engaged by teeth of said cogged belt, wherein with the movement of the rock drill and cradle relative to the feed beam, said cogged belt turns about said gear for part of the periphery of said gear and rotates said gear, and an indicator measures rotation of the gear and emits signals proportional to the movement of the rock drill such that the position of the rock drill relative to the feed beam is measured.

7. An arrangement as claimed in claim 6, further comprising first and second diverter pulleys installed forwardly and rearwardly of said gear, respectively, in said longitudinal direction of the feed beam and wherein said teeth face said feed beam to turn about said first diverter pulley away from said feed beam, to turn about said gear back towards said feed beam and further to turn about said second diverter pulley.

8. An arrangement as claimed in claim 6, wherein fixing means are installed in said feed beam for fixing the ends of the cogged belt, the fixing means having grooves which match with said teeth of the cogged belt and in which said teeth of the cogged belt can be received, and at least one clamping means for clamping the cogged belt against the grooves, thereby fixing said cogged belt immovably relative to the feed beam.

9. An arrangement as claimed in claim 8, wherein the grooves in the fixing means are provided by a piece of cogged belt secured to the fixing means, installed with teeth meshing with the teeth of the cogged belt.

* * * * *